United States Patent
Myers

(10) Patent No.: US 6,877,049 B1
(45) Date of Patent: Apr. 5, 2005

(54) INTEGRATED FIFO MEMORY MANAGEMENT CONTROL SYSTEM USING A CREDIT VALUE

(75) Inventor: Thomas Andrew Myers, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 182 days.

(21) Appl. No.: 10/161,470

(22) Filed: May 30, 2002

(51) Int. Cl.$^7$ ............................................. G06F 3/00
(52) U.S. Cl. .......................... 710/56; 710/52; 710/53; 710/54; 710/55; 710/57
(58) Field of Search ................................ 710/52–57, 5, 710/6, 29, 33, 35; 709/233, 234; 712/405

(56) References Cited

U.S. PATENT DOCUMENTS

| | | | | |
|---|---|---|---|---|
| 4,942,553 A | * | 7/1990 | Dalrymple et al. | 710/57 |
| 5,544,326 A | * | 8/1996 | Pease et al. | 710/310 |
| 5,732,286 A | * | 3/1998 | Leger | 710/57 |
| 5,771,356 A | * | 6/1998 | Leger et al. | 709/233 |
| 5,784,649 A | * | 7/1998 | Begur et al. | 710/52 |
| 5,892,979 A | * | 4/1999 | Shiraki et al. | 710/52 |
| 6,208,644 B1 | * | 3/2001 | Pannell et al. | 370/389 |
| 6,253,297 B1 | * | 6/2001 | Chauvel et al. | 711/167 |
| 6,450,832 B1 | * | 9/2002 | Aguilar et al. | 439/490 |
| 6,463,485 B1 | * | 10/2002 | Chui et al. | 710/52 |
| 6,526,068 B2 | * | 2/2003 | Smith | 370/474 |
| 6,651,114 B1 | * | 11/2003 | Minami | 710/22 |
| 2002/0178306 A1 | * | 11/2002 | Shimizu | 710/56 |
| 2003/0110364 A1 | * | 6/2003 | Tang et al. | 711/168 |
| 2003/0160796 A1 | * | 8/2003 | Lavelle et al. | 345/557 |

FOREIGN PATENT DOCUMENTS

| | | | | |
|---|---|---|---|---|
| JP | 11161467 A | * | 6/1999 | G06F/5/06 |
| JP | 2000010759 A | * | 1/2000 | G06F/5/06 |
| JP | 2001188748 A | * | 7/2001 | G06F/13/28 |

\* cited by examiner

*Primary Examiner*—Jeffrey Gaffin
*Assistant Examiner*—Angel L. Casiano
(74) *Attorney, Agent, or Firm*—Workman Nydegger

(57) ABSTRACT

An integrated data controller that utilizes a first-in first-out (FIFO) management system that compensates for the unpredictable nature of latency associated with requesting data from memory and enables the timing of data requests to be determined based on the number of pending requests and the amount of data currently residing in the buffer. The FIFO management system includes a FIFO controller and a FIFO buffer that monitor a credit value and a trigger value to determine when to make data request bursts upon a memory unit. The trigger value is an indication of whether there is a sufficient amount of free space for it to be beneficial to make a data request burst and the credit value is a number that indicates the number of a data blocks that should be requested in the data request burst.

21 Claims, 3 Drawing Sheets

US 6,877,049 B1

INTEGRATED FIFO MEMORY MANAGEMENT CONTROL SYSTEM USING A CREDIT VALUE

BACKGROUND OF THE INVENTION

1. The Field of the Invention

This invention relates generally to the field of memory management devices for use in a computer network. In particular, embodiments of the present invention relate to an integrated credit based buffer management scheme for use in a memory first-in first-out (FIFO) control application.

2. The Relevant Technology

Most computer devices and processors have some form of memory or storage device for the purpose of storing data. Often, a processor or a computer operates with multiple clients, which may be applications or hardware devices, that require access to the stored data. Thus, the stored data must be accessible by the various applications and devices used within the system. To facilitate this accessibility, particularly for processors or computers that have multiple clients that require access to the stored data substantially contemporaneously with each other, some form of switching device must be used to switch between various links to the data within the storage device.

One common technique for providing substantially contemporaneous access to stored data is to establish multiple ports, each of which can be used by a different client. An arbiter is a common switching device that manages the requests for data made from multiple clients, determines the appropriate priority of the multiple requests, and switches between the various ports to enable the requests to be serviced. Unfortunately, switching systems such as an arbiter introduce additional delay when a particular client requests data from the memory, much of which results from that fact that, from the standpoint of the client, the timing by which the arbiter grants access to the memory through the associated port is unpredictable.

In addition to providing accessibility to the data within a computer system, it is also important to manage the data flow between a particular client, such as a device or application, and the memory. A client typically has a buffer, such as a first-in first-out (FIFO) buffer, that receives data that has been requested from the memory. The buffer is used because the timing by which the data is received from the memory is unpredictable due to the necessity of a switching device between the client and the memory and the variable latency associated with data requests. The buffer enables sufficient data to be immediately accessible to the client as the client requires the data for processing operations.

The size of a FIFO buffer for a particular client is selected based on several factors, including the variability or unpredictability of the latency associated with the data requests and the degree to which a continual stream of data is required by the client. Assuming that the client cannot tolerate loss of continuous data, the buffer must be large enough to avoid an overflow situation in which the buffer is full when additional data requests are serviced, and an underflow situation, in which the data in the buffer is depleted before additional data requests are serviced. The problem of ensuring that continuous data is available to the client from the buffer can generally be solved by using a buffer that is sufficiently large to avoid the overflow situation or to have sufficient bandwidth between the buffer and the memory such that the latency is reduced. However, either of these approaches to the problem is expensive.

BRIEF SUMMARY OF THE INVENTION

These and other problems in the prior art are addressed by embodiments of the present invention, which relates to an integrated data controller that utilizes a first-in first-out (FIFO) management system that enhances the predictability of the latency that may be experienced when requesting data from memory and enables the timing of data requests to be determined based on the number of pending requests and the amount of data currently residing in the buffer. In this manner, the problem of overflow and underflow of the buffer can be managed while reducing the need to use larger buffers or larger bandwidths to communicate with the memory.

According to one aspect of the invention, the integrated data controller manages data flow between a switched memory or storage device and a client, such as an application that requires data stored in the memory. The switched memory and data controller can be located on the same printed circuit board for manufacturing purposes. The data controller further includes a FIFO buffer and a FIFO controller. The number of data requests made by the FIFO controller to the memory and the timing thereof are selected by the use of a credit monitoring technique including a credit value and a trigger value. The credit value is incremented when data is received from the memory and is decremented when data requests are made upon the memory. The trigger value is a Boolean value that indicates whether or not to execute a data request burst upon the memory.

The FIFO buffer has a certain number of storage locations which can each accept one data block of a particular size. The FIFO buffer compares a level indicator, which is the number of available or empty storage locations, to a trigger threshold value which is a predetermined number of available locations which must be satisfied before it is efficient to make a data request burst. The FIFO buffer determines the trigger value based on the comparison between the trigger threshold and the level indicator. The trigger value is then transmitted to the FIFO controller. The FIFO controller generates a credit value generally related to the number of available storage locations in the FIFO buffer and the number of pending data requests. The credit value is given an initial value corresponding to the number of storage locations in the FIFO buffer. The FIFO controller executes at least one data request burst when the trigger value transmitted from the FIFO buffer indicates that it is time to execute a data request burst. A data request burst can be made for a number of data blocks equal to the total number of available credits or alternatively multiple data requests bursts can be made, each requesting a fixed number of data blocks until the credit value is decremented to approximately zero. Since there are limited times in which the FIFO controller has access to the memory, as controlled by an arbiter, this system enables the FIFO controller to maximize the overall number of data blocks obtained in the data request bursts made to the memory without overflowing the FIFO buffer and potentially losing data.

The credit monitoring technique described above is a significant improvement over existing solutions to the problem of efficiently requesting data from a switched memory device. The client monitoring technique allows the FIFO controller to maximize the available windows of opportunity in which data can be requested from the memory. This technique of sending data request bursts is more efficient than simply executing data requests as needed. Because of the unpredictable windows of opportunity with which data can be requested from the memory, data requests that are made as needed are likely to underutilize the opportunities to transfer data from the memory. In addition, this credit based technique is more cost effective than simply increasing the bandwidth or buffer size of the data controller.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to an integrated data controller that utilizes a first-in first-out (FIFO) credit based management system that compensates for the unpredictability of the latency that may be experienced when requesting data from memory and enables the timing of data requests to be determined based on the number of pending requests and the amount of data currently residing in the buffer. In this manner, the problem of overflow and underflow of the buffer can be managed while reducing the need to use larger buffers or larger bandwidths to communicate with the memory. Also, while embodiments of the present invention are described in the context of optimizing data flow from a memory to an application, it will be appreciated that the teachings of the present invention are applicable to other applications as well.

Figure 1:
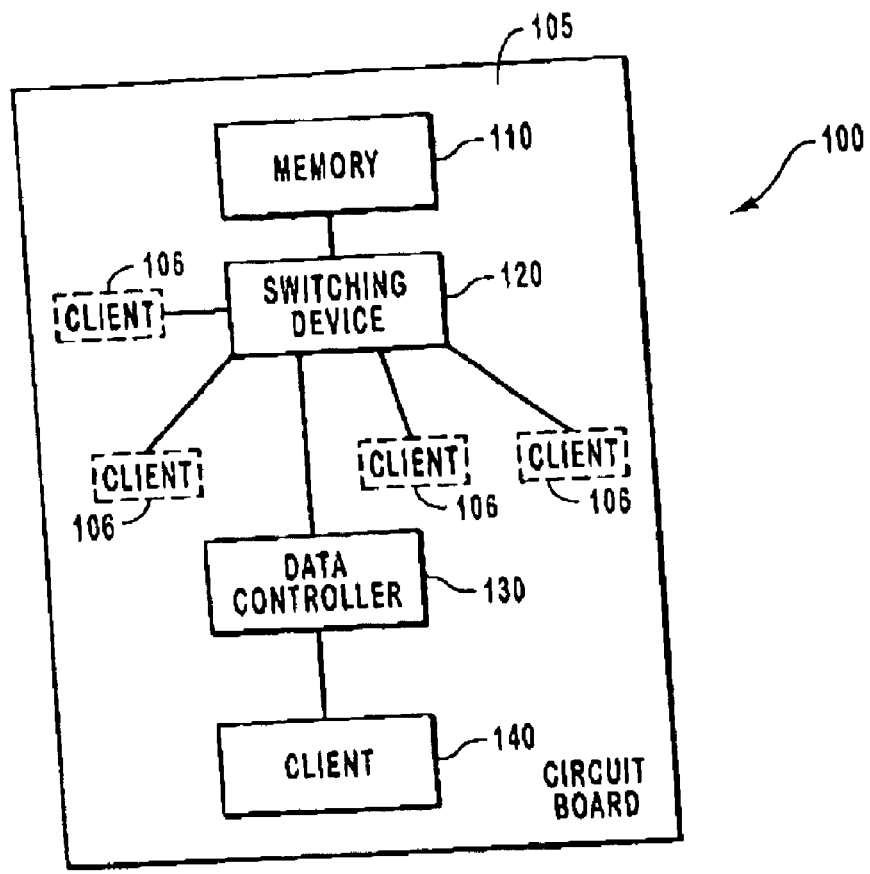
FIG. 1 illustrates a schematic representation of an environment for the integrated data controller of the present invention.

Reference is first made to FIG. 1, which illustrates a schematic representation of an environment for the integrated data controller of the present invention, designated generally at 100. The environment 100 is a data storage system in which the client 140 is utilizing data from the memory 110. Client 140 is any application or hardware device that requests access to data of memory 110. The system also includes a switching device 120, such as an arbiter, that allows multiple clients to access the data within the memory 110. The additional clients 106, represented with dashed lines, can access the memory through switching device 120 independently from client 140. A data controller 130 is positioned between the client 140 and the memory 110. The data controller 130 maximizes the efficiency of data transfer between the memory 110 and the client 140 by storing data and requesting data at appropriate times. The data controller 130 will be described in more detail with reference to FIGS. 2 and 3. All of the components in this data storage system of FIG. 1 can be integrated onto a single printed circuit board 105. This integration allows all of the devices to be manufactured at the same time and reduces fabrication costs.

The memory 110 in FIG. 1 can be any form of digital integrated circuit storage device such as an SDRAM, DRAM, RAM, ROM, etc. These devices all store data digitally so that it can be retrieved later. In general, one client can access the memory at a certain time and therefore it is necessary to switch the memory 110 between multiple interfaces with a switching device 120. The switching device 120 in the illustrated environment 100 is an arbiter which switches between multiple ports, each providing access to one of the clients. Arbiters are commonly used in memory management systems to allocate access to memory among multiple clients by determining the priority to be given to the data requests issued by multiple clients.

Figure 2:
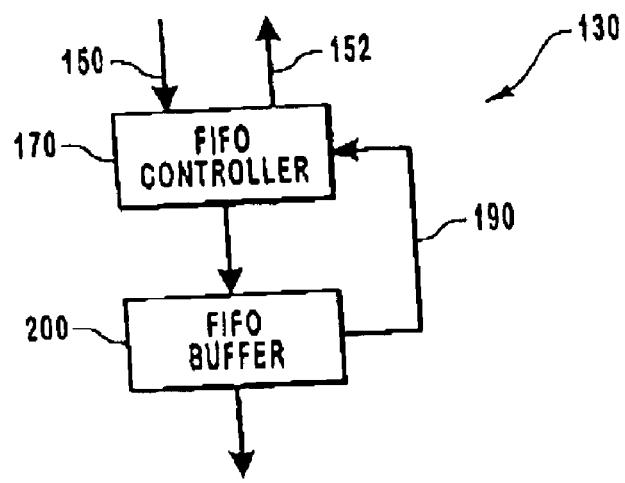
FIG. 2 illustrates a schematic representation of a presently preferred embodiment of the data controller of the present invention.

Reference is next made to FIG. 2, which illustrates a schematic representation of a presently preferred embodiment of the data controller of the present invention, designated generally at 130. The data controller 130 manages the data flow from a memory to a client via pathway 150 and 152. The presently preferred data controller 130 further includes a FIFO controller 170 and a FIFO buffer 200. The FIFO controller 170 and the FIFO buffer 200 manage a credit value and a trigger value, which are used to determine when to make data requests upon the memory. Each credit represents a data request that can be made if the amount of data in the buffer falls to or below the trigger threshold. When data request bursts 160 are made upon the memory, the credit value is decremented by the number of data blocks requested in the data request burst 160. The credit value is incremented by the number of data blocks that are actually received by the FIFO controller in response to the previous data request bursts. The trigger value is generally implemented as a "1" or a "0" that represent, respectively, the Boolean values "yes" and "no". The Boolean trigger value is determined in the FIFO buffer 200 by comparing a predetermined trigger threshold to a level indicator. For example, if tile trigger threshold is four and there are eight data storage locations within the FIFO buffer 200, the trigger 19 value is "yes" if there are four to eight available storage locations in the FIFO buffer 200 as indicated by the level indicator 190. The trigger value 190 is "no" if there are zero to three available storage locations in the FIFO buffer 200 as indicated by the level indicator 190. As used herein, an "available" storage location in a FIFO buffer is a storage location that is available to receive an incoming data block from memory without overwriting a previous data block that has not yet been used by the client. The actual logical process by which these values are calculated and monitored within the FIFO controller 170 and the FIFO buffer 200 are discussed in more detail with reference to FIG. 3. This system ensures that the number of requests made during a request burst, when the arbiter grants the FIFO controller access to the memory, is sufficiently large to take advantage of the limited bandwidth and to avoid depletion of the buffer, but is sufficiently small to avoid causing overflow of the buffer.

In operation, the FIFO controller 170 monitors the Boolean trigger value to determine when to submit a data request burst to the memory. When the Boolean trigger value becomes "yes", the FIFO controller 170 sends a data request burst 160 to the memory for a certain number of data blocks. The number of data blocks requested in the data request burst 160 is equal to the current credit value maintained by the FIFO controller 170. Alternatively, data request bursts can be fixed to request a specific number of data blocks from the memory. In this alternative arrangement, the FIFO controller 170 successively performs the acts of sending a data request burst for a specified number of data blocks (e.g., data words), decrementing the credit value by the number of data blocks requested, and determining whether the credit value indicates that another data request burst should be initiated, in which case, another data request burst is sent. In this embodiment, the data request bursts are successively transmitted until the credit value indicates that another data request burst would drop the credit value to below zero. This means that after each credit request burst, the FIFO controller 170 analyzes whether there is a sufficient number of credits to permit another data request burst for a fixed amount of data blocks to be made.

The act of sending the data request burst 160 to the memory decrements the credit value by the number of requested data blocks within the data request burst 160. For instance, if each data request has the effect of requesting a single data block, the credit value is decremented by one for each data request. The memory then transfers the requested data blocks to the FIFO controller via data pathway 150. At any given moment after the data request burst, due to latency associated with the data requests, the number of data blocks received by data controller 130 may be less than the number of requested data blocks. Each data block that has not yet been received corresponds to a pending data request. Because the credit value is incremented when the data block is received in response to a data request, the credit value takes into account the number of available storage locations in the FIFO buffer as well as the number of pending data requests that have not yet been fulfilled.

Figure 3:
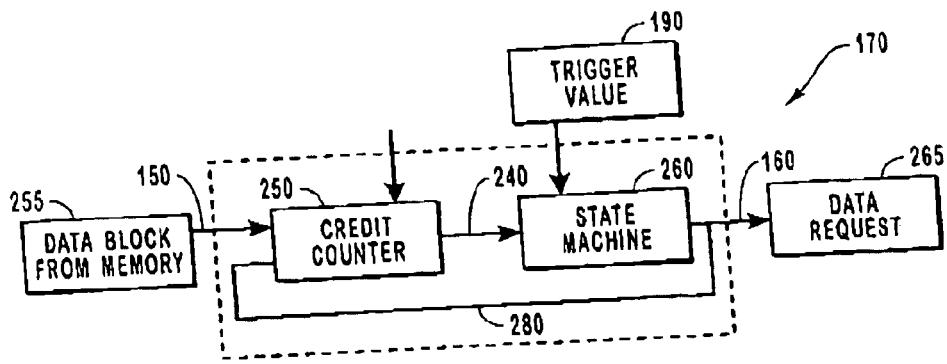
FIG. 3 illustrates a schematic representation of the components of the FIFO controller illustrated in FIG. 2.

Reference is next made to FIG. 3, which illustrates a schematic representation of the components of the FIFO controller illustrated in FIG. 2, designated generally at 170. The FIFO controller 170 includes a credit counter 250 and a state machine 260. The credit counter 250 controls the incrementing and decrementing of the credit value when specific events take place. Data blocks 255 are received from memory through the data pathway 150 in response to data requests 265 of a data request burst initiated by the state machine 260. The credit counter 250 increments the credit value by the number of data blocks 255 received from the memory via the data pathway 150. As discussed above with reference to FIG. 2, the incrementing of the credit value by the exact amount of data blocks 255 received by the memory ensures that the credit value accounts for pending data requests 265 that are still in process within the memory. The storage and manipulation of the credit value by the credit counter can be implemented in digital logic circuitry.

The state machine 260 receives a trigger value 190 from the FIFO buffer 200 (FIG. 2) which informs the state machine 260 when it is appropriate to transmit at least one data request burst. This trigger value is a Boolean value, which is either a "1" or a "0" corresponding, for example, to a "yes" or a "no". The actual calculation to create the trigger value can be performed at the FIFO buffer 200 (illustrated in FIG. 2). The FIFO buffer 200 contains a level indicator and a trigger threshold. The level indicator is a numeric value equal to the number of available data storage locations within the FIFO buffer 200. The trigger threshold is a numeric value corresponding to the number of available storage locations in the FIFO buffer 200 that are required before a data request burst should be sent out. This trigger threshold can be programmed into a processing device associated with the FIFO buffer 200 and is selected based on the rate by which the data in the buffer is depleted by the client as well as the frequency by which data requests can be made and the typical latency of data requests. While in the examples illustrated herein, the trigger threshold is half the capacity of the FIFO buffer, other trigger thresholds can be used.

The FIFO buffer 200 compares the trigger threshold to the level indicator to determine whether to make the trigger value 190 a "yes" or a "no". The trigger value is then transmitted from the FIFO buffer 200 to the state machine 260. When the level indicator is equal to or greater than the trigger threshold, the Boolean trigger value 190 is given a value "yes" indicating that a data request burst should be sent out. A data request burst having data requests 265 is subsequently transmitted from the FIFO controller 170 to the memory for a particular number of data blocks. The number of data blocks requested in the data request burst is equal to the current credit value, which is transferred from the credit counter 250 to the state machine 260 via data pathway 240.

Alternatively, data request bursts can be fixed to request a specific number of data blocks from the memory. In this alternative arrangement, the state machine 260 successively performs the acts of sending a data request burst for a specified number of data blocks (e.g., data words), decrementing the credit value by the number of data blocks requested, and determining whether the credit value indicates that another data request burst should be initiated, in which case, another data request burst is sent. In this embodiment, the data request bursts are successively transmitted until the credit value indicates that another data request burst would drop the credit value to below zero. This means that after each credit request burst, the FIFO controller 170 analyzes whether there is a sufficient number of credits to permit another data request burst for a fixed amount of data blocks to be made. When the state machine executes the data request burst(s) to the memory, an indication of the number of data blocks requested (e.g., the number of data requests) is transmitted to the credit counter via data pathway 280. The credit counter 250 in turn decrements the credit value by the number of data blocks requested in the pending data request burst.

In one presently preferred embodiment, the trigger threshold is set to half of the total number of data blocks within the FIFO buffer. This means that whenever the level indicator is equal to or greater than half of the data blocks within the FIFO buffer, the trigger value will be "yes". Since the level indicator is a digital numeric value, the value of the most significant bit of the level indicator can be used to quickly determine whether or not the level indicator is equal to or greater than half of the total number of data blocks within the FIFO buffer. For example, if there are eight total data blocks within the FIFO buffer, a three bit digital sequence is necessary to express numbers between 0 and 7. For all numbers 4–7, the first bit will be a 1 while for all numbers 0–3 the first bit will be a 0. This simplifies the comparison between the level indicator and the trigger threshold since the first bit of the level indicator in this example can simply be used as the trigger value without any additional comparison.

Figure 4A:
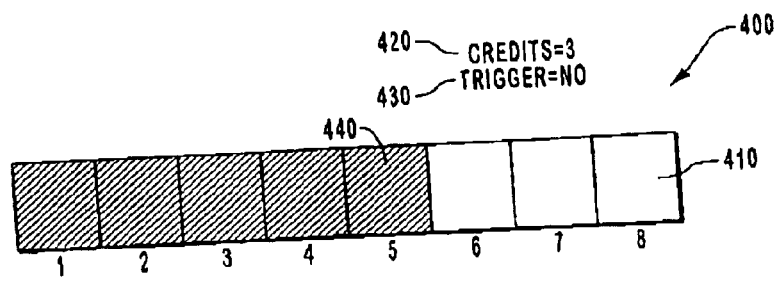
FIG. 4A illustrates a block diagram of the FIFO buffer illustrating a situation in which the data controller does not send a data request to memory because the trigger value has not been satisfied.

FIG. 4A illustrates a block diagram of the FIFO buffer illustrating a situation in which the data controller does not send a data request to memory, designated generally at 400. The illustrated block diagram is one embodiment of a FIFO buffer which contains eight data storage locations some of which are empty storage locations 410 and some of which are full storage locations 440. An empty storage location is defined as one that is available to receive an incoming data block from memory without overwriting another data block that has not yet been used by the client. Similarly, a full storage location is one that is not available to receive an incoming data block and is typically a storage location having a data block that has not yet been used by the client.

The diagram also illustrates the credit value 420 and the trigger value 430. When no pending data requests exist, the credit value 420 is generally equal to the number of empty storage locations 410 within the FIFO buffer. However, the credit value may be different than the number of empty storage locations 410 depending on whether there are pending data requests that have not been fulfilled. The trigger value 430 is a Boolean indicator of whether or not the number of empty storage locations is equal to or greater than a trigger threshold. The trigger threshold for this example is four, meaning that when there are four to eight empty storage locations 410 in the FIFO buffer, the trigger value is "yes". The illustrated example of FIG. 4A shows a FIFO buffer with three empty storage locations. 410 and five full storage locations 440. The number of credits is three (meaning that no pending data requests exist) and the trigger value is "no", because the number of empty storage locations 410 has not met or exceeded the trigger threshold. Therefore, this state indicates that it is not yet necessary to make a data request burst to the memory. Moreover, based on the value of the trigger threshold, it is likely more efficient to wait until more storage locations of FIFO buffer 400 become depleted to make a data request burst.

Figure 4B:
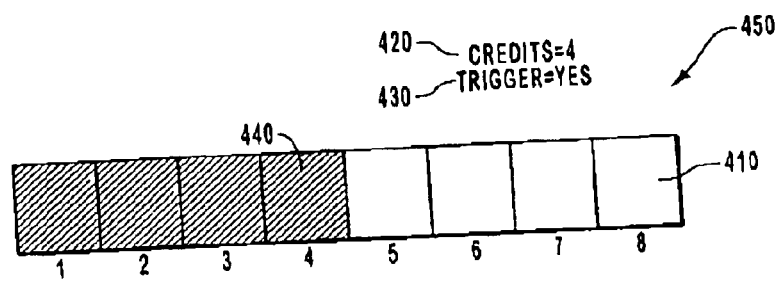
FIG. 4B illustrates a block diagram of the FIFO buffer illustrating a situation in which the data controller sends a data request to memory because the trigger value has been met.

FIG. 4B illustrates a block diagram of the FIFO buffer illustrating a situation in which a the data controller sends data requests to memory, designated generally at 450. The illustrated block diagram represents the FIFO buffer of FIG. 4A after the number of empty storage locations 410 has fallen to the trigger threshold. The diagram also illustrates the credit value 420 and the trigger value 430. The credit value 420 in this example is four, which is equal to the number of empty storage locations 410 within the FIFO buffer, and indicates that no pending data requests exist. In contrast if, for example, two data requests were pending and had not yet been fulfilled, the credit value would be equal to two. In the illustrated example of FIG. 4B, the trigger value is "yes", because the number of empty storage locations 410 has met or exceeded the trigger threshold. Therefore, this state indicates that a data request burst should be made to the memory.

Figure 5:
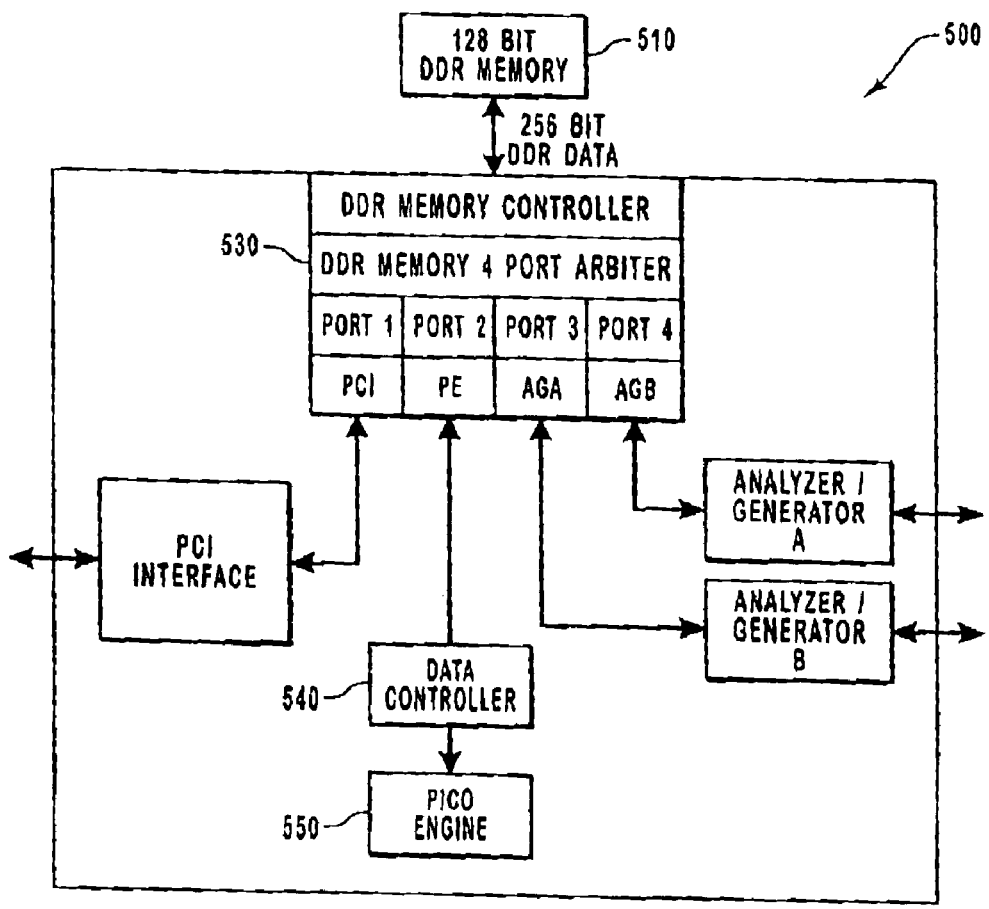
FIG. 5 illustrates a schematic representation of an implementation of the credit based management system within an optical networking environment.

Reference is next made to FIG. 5, which illustrates a schematic representation of an implementation of the credit based management system within an optical networking environment, designated generally at 500. While the buffer management systems can be used iii a variety of computing environments, FIG. 5 illustrates a buffer management system for use with a processor of an optical network protocol analyzer memory. The memory 510 is a double data rate synchronous dynamic random access memory (DDR SDRAM) that receives data that has been transmitted on an optical network. The data stored in memory 510 has been received in optical signals by transceivers, converted to electrical signals, and converted to parallel data that can be stored in memory 510. An arbiter 530, which corresponds to the switching device 120 illustrated in FIG. 1, provides access to memory 510 through a memory controller. The data controller 540 is an example of the data controller 130 in FIG. 1.

FIG. 5 illustrates multiple clients that gain access to the data of memory 510 through arbiter 530, including a PCI to local bus bridge chip that uses the PCI interface of FIG. 5, analyzers/generators that use the analyzer/generator interfaces, and a Pico Engine 550, which is developed by Finisar Corporation of Sunnyvale, Calif., and represents an example of a processing engine that can perform protocol analysis on network data and do so at runtime at speeds in excess of one Gigabit per second. Processing engine 550 is capable of synchronously processing data on a line speed basis, which is in contrast to other protocol analyzers, which either process only a portion of the network data at runtime or store the data for later processing. Further details concerning the specific hardware construction and operation of the example of the processing engine represented by Pico Engine 550 may be obtained from U.S. patent application Ser. No. 09/976,756, entitled "Synchronous Network Traffic Processor," filed Oct. 12, 2001, which is incorporated herein by reference.

The buffer management methods and systems of the invention are particularly useful in connection with clients, such as the processing engine 550, that operate at runtime at high speeds and require a continuous supply of data that would be interrupted if the associated buffer were to experience underflow or overflow conditions. Moreover, the buffer management systems and methods are also particularly useful in data processing environments, such as that depicted in FIG. 5, in which the client requiring substantially continuous high speed access to data from the buffer shares access to the memory with other clients.

Using the buffer management techniques of the invention enhance the efficiency of the protocol analyzers that are partially illustrated in FIG. 5. However, it will be appreciated that the teachings of the present invention are applicable to other applications and networking environments and are not limited to any particular network or physical protocol. While illustrated embodiment have been described in the context of an optical-based network, it will be appreciated that the present invention is equally applicable to non-optics based networks, such as a shielded electrical cables, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An integrated data control system comprising:
   a switched data storage device; and
   a data controller that utilizes a FIFO credit based data management system to access a memory through the switched data storage device, the data controller including:

a FIFO controller that monitors and adjusts a credit value used to request data blocks through the switched data storage device, wherein the credit value represents the number of data blocks that can be requested on at least one subsequent data request burst upon the switched data storage device, wherein the credit value includes both at least a number of available storage locations in a FIFO buffer and pending data requests such that the at least one subsequent data request burst maximizes data blocks requested in the at least one subsequent data request burst without causing the FIFO buffer to overflow; and a FIFO buffer that monitors and adjusts a trigger value, wherein the trigger value is an indicator of whether or not the FIFO controller should transmit a data request burst upon the switched data storage device at that present time, wherein the trigger value is determined by comparing a trigger threshold to a level indicator, the trigger value is transmitted to the FIFO controller via a data link.

2. An integrated data control system of claim 1, wherein the data storage device and the data controller are located on the same printed circuit board.

3. An integrated data control system of claim 1, wherein the credit value, level indicator and the trigger threshold are digital integer values and the trigger value is a Boolean value.

4. An integrated data control system of claim 1, wherein the FIFO controller further includes:

a credit counter that receives a plurality of data blocks from the switched data storage device and increments the credit value by the number of data blocks received, and wherein the credit counter decrements the credit value when a data request burst is transmitted to the switched data storage device for each data block requested in the data request burst; and a state machine that receives the trigger value from the FIFO buffer and the credit value from the credit counter, and wherein if the trigger value is positive the state machine transmits the data request bursts to the switched data storage device.

5. An integrated data control system of claim 1, wherein the switched data storage device includes:

a memory device configured to digitally store information as a series of 1s or 0s; and an arbiter configured to switch the memory device between a plurality of ports such that the data controller is only connected to one of the ports.

6. An integrated data control system of claim 1, wherein the FIFO buffer is a temporary storage device that is connected to a client such that data blocks from the FIFO buffer are transferred to the client at regular intervals.

7. An integrated data control system of claim 6, wherein the client comprises a processing engine associated with a protocol analyzer and analyzes network data at line speeds.

8. An integrated data control system of claim 1, wherein the data request bursts request a fixed number of data blocks from the switched data storage device.

9. A method of determining when to transmit a data request burst to a storage device comprising:

maintaining a credit value for a buffer that prevents the buffer from overflowing, wherein the credit value includes both empty storage locations in a buffer and pending data requests to a switched storage device;

receiving a specific number of data blocks from the switched storage device;

incrementing the credit value by the specific number of data blocks received from the switched storage device;

comparing a level indicator, indicating the number of empty data storage locations in a buffer, to a trigger threshold, indicating the state of the buffer which should trigger a data request burst to be made, to determine if the level indicator is equal to or greater than the trigger threshold; and if the level indicator is equal to or greater than the trigger threshold performing the following steps:

executing at least one data request burst upon the switched storage device for a number of data blocks equal to the credit value; and decrementing the credit value by the number of blocks requested in the data request burst.

10. The method of determining when to transmit a data request burst to a storage device of claim 9, wherein the switched data storage device further includes:

a memory device configured to digitally store information; and an arbiter configured to switch the memory device between a plurality of ports, one of which provides the data controller with access to the storage device.

11. The method of determining when to transmit a data request burst to a storage device of claim 9, wherein the credit value, level indicator and the trigger threshold are integer values and the trigger value is a Boolean value.

12. The method of determining when to transmit a data request burst to a storage device of claim 9, wherein the method further includes transferring the received data blocks to a client.

13. The method of determining when to transmit a data request burst to a storage device of claim 12, wherein the client comprises a processing engine associated with a protocol analyzer and analyzes network data at line speeds.

14. The method of determining when to transmit a data request burst to a storage device of claim 9, wherein data request bursts request a fixed number of data blocks from the switched storage device.

15. A data controller comprising:

a FIFO controller that monitors and adjusts a credit value used to request data blocks, wherein the credit value represents a number of data blocks that can be requested on at least one subsequent data request burst upon the switched data storage device, wherein the credit value includes both a number of available storage locations in a FIFO buffer and pending data requests such that the at least one subsequent data request burst maximizes bandwidth without causing the FIFO buffer to overflow; and a FIFO buffer that monitors and adjusts a trigger value, wherein the trigger value is an indicator of whether or not the FIFO controller should transmit a data request burst upon the switched data storage device at that present time, wherein the trigger value is determined by comparing a trigger threshold to a level indicator, the trigger value is transmitted to the FIFO controller via a data link.

16. A data controller of claim 15, wherein the credit value, level indicator and the trigger threshold are digital integer values and the trigger value is a Boolean value.

17. A data controller of claim 15, wherein the FIFO controller further includes:

a credit counter which receives a plurality of data blocks from a data storage device and increments the credit value by the number of data blocks received, and wherein the credit counter decrements the credit value when a data request burst is transmitted to the switched data storage device;

a state machine that receives the trigger value from the FIFO buffer and the credit value from the credit counter, and wherein if the trigger value is positive the state machine transmits the data request bursts to the switched data storage device.

18. A data controller of claim 17, wherein the data storage device includes:

a memory device configured to digitally store information; and an arbiter configured to switch the memory device between a plurality of ports such that the data controller is only connected to one of the ports.

19. A data controller of claim 15, wherein the FIFO buffer is a temporary storage device that is connected to a client such that data blocks from the FIFO buffer are transferred to the client at regular intervals.

20. A data controller of claim 19, wherein the client comprises a processing engine associated with a protocol analyzer and analyzes network data at line speeds.

21. A data controller of claim 19, wherein the data request bursts request a fixed number of data blocks.

* * * * *